(No Model.)

J. H. ADAMSON.
MACHINE BELTING.

No. 376,174. Patented Jan. 10, 1888.

Attest:
W. J. Coulter,
C. M. Gallaher

Inventor
James H. Adamson
by Henry Orth
his attorney

United States Patent Office.

JAMES HAZEL ADAMSON, OF MELBOURNE, VICTORIA, ASSIGNOR OF ONE-HALF TO JAMES FOX MELLOR AND BENJAMIN FOX MELLOR, BOTH OF ADELAIDE, SOUTH AUSTRALIA.

MACHINE-BELTING.

SPECIFICATION forming part of Letters Patent No. 376,174, dated January 10, 1888.

Application filed November 9, 1887. Serial No. 254,702. (No model.) Patented in Victoria July 28, 1886, No. 4,641.

*To all whom it may concern:*

Be it known that I, JAMES HAZEL ADAMSON, a subject of the Queen of Great Britain, residing at Melbourne, in the British colony of Victoria, engineer, have invented Improvements in and Connected with Belts or Straps for Transmitting Motion, (for which I have obtained a patent in the British colony of Victoria, dated the 28th day of July, 1886, and numbered 4,641,) of which the following is a specification.

This invention has been devised for the purpose of providing a belt or strap for transmitting motion which will be less liable to slip than those hitherto made. To accomplish this object the belt or strap is made with projections on its bearing-surface instead of being made with a plain bearing-surface. This belt must not be used with ordinary metal pulleys, but with pulleys having a coating of some easily-impressible and elastic material, such as india-rubber, into which coating the projections on the belt will press and bite. If preferred, the pulleys when small may be made wholly of such material. The projections on the belt or strap may be produced in a variety of ways and of a variety of material; but so long as they are projections that will bite or sink into the impressible and elastic material with which the pulleys are coated, so as to render the belt less liable to slip, it is included in this invention. As illustrations, transverse ridges or projections may be made of cord or wire, or a series of staples or rivets may be driven through the belt and clinched at the back, or these ridges or projections may form part of the substance of the belt or strap. The faces of the pulleys may be coated with any kind of readily-impressible and elastic material, (although india-rubber is the best,) and this may either be made tubular and slipped over the pulley, or it may be in sheets or strips and be secured on the face of the pulley. In some cases it will be found inexpedient to have the faces of all the pulleys coated with the impressible and elastic material—as, for instance, when one or more of them is or are of large diameter—because considerable expense would be saved by dispensing with such coating. In such cases the belt is twisted, so as to have the surface with the projections bearing on the pulley which is coated, as stated, and the plain surface bearing on the ordinary pulley.

Referring to the accompanying drawings, Figure 1 represents a belt and pulley made according to this invention; Fig. 2, a plan and and cross-section of the belt.

A is the pulley and A' the impressible and elastic material with which its face is coated. B is the belt and B' the projecting staples thereon.

Figure 1:
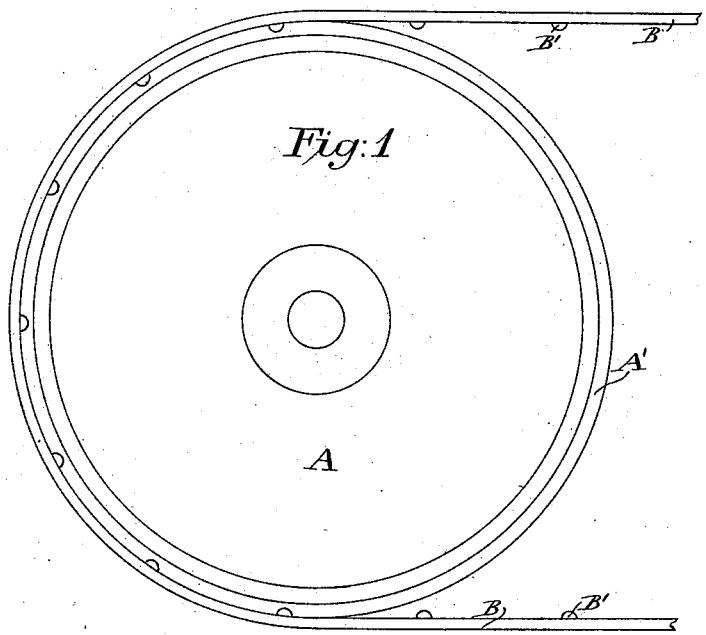
Figure 6:
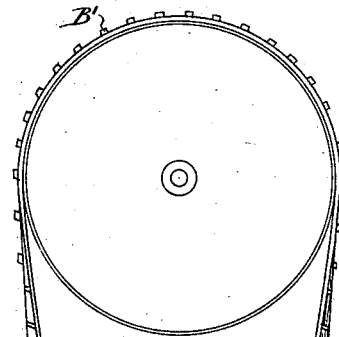
Fig. 6 shows the method of using this improved belting with one pulley coated with the easily-impressible and elastic material, and the other one not coated. In this case it will be seen that the belting is twisted, so as to cause the plain surface of the belt to run over the uncoated pulley and the ribbed surface to run over the coated pulley.
Figure 2:
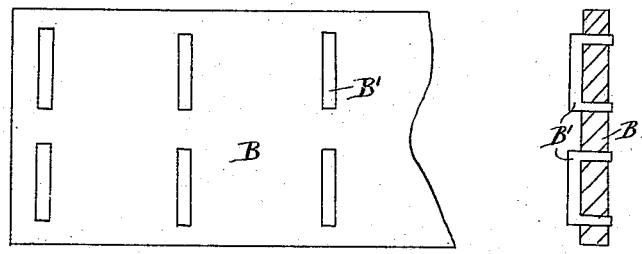
Figures 3, 4:
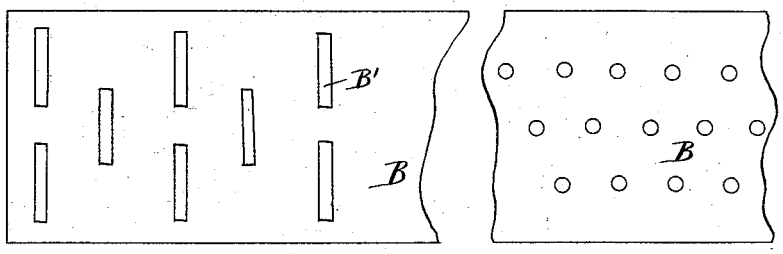
Fig. 3 is a plan of this improved belting, with the staples arranged differently to those in Fig. 2.
Fig. 4 is a plan of this improved belting in which the staples are substituted by rivets.
Figure 5:
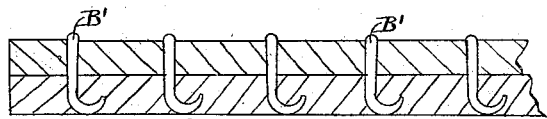
Fig. 5 shows a double-ply belt, with the points of the staples clinched.

Having thus described the nature of this invention and the manner of performing same, it is to be understood that any kind of projection may be used on the face of the belting which will bite or impress itself onto or into the coating on the pulley or pulleys, and any kind of coating may be used for the pulleys into which such projections will bite or impress themselves and which is elastic in its character.

What is claimed, therefore, is—

1. The combination, substantially as described, with a driving-belt of animal or vegetable material or texture having a smooth face and a face provided with metallic projections, of a pulley having a rubber-covered face, for the purpose specified.

2. The combination, substantially as described, with a driving-belt provided with a smooth face and a face provided with metallic projections, of a pulley having a hard and unyielding face, and a pulley having a more or less elastic or yielding face, the smooth face of the belt operating upon the unyielding face of the former pulley and that face of the belt provided with the metallic projections operating upon the pulley having the unyielding face by twisting the belt, for the purpose specified.

JAMES HAZEL ADAMSON.

Witnesses:
EDWARD WATERS,
WALTER CHARLES HART.